United States Patent Office 3,118,848
Patented Jan. 21, 1964

3,118,848
COATING COMPOSITIONS COMPRISING A WATER-SOLUBLE SALT OF A VINYL COPOLYMER AND A WATER-SOLUBLE EPOXY OR POLYHYDROXY COMPOUND
Louis J. Lombardi, Howard J. Wright, and Paul F. Westfall, Kansas City, Mo., assignors to Cook Paint & Varnish Company, Kansas City, Mo., a corporation of Delaware
No Drawing. Filed May 3, 1960, Ser. No. 26,422
13 Claims. (Cl. 260—29.3)

The present invention relates to novel water-soluble heat-curable resinous compositions and aqueous solutions thereof suitable for use as coating compositions.

The principal object of the invention is the provision of novel water-soluble resinous products which can be baked or heat-cured from aqueous solution to form highly desirable water-insoluble coatings.

Broadly stated, the products of the invention are prepared by mixing together a water-soluble salt of a vinyl polymer, and a water-soluble epoxy or polyhydroxy compound. One or more water-soluble phenol-aldehyde or amino resins, notably water-soluble urea-aldehyde or melamine-aldehyde resins, may optionally be included as curing agents where low baking temperatures are contemplated.

Essential details of the various components constituting the present products and other aspects of the invention, including preferred modes of operating in accordance therewith, are described below.

The vinyl polymer constituent used in the present invention may be any of the vinyl polymer starting materials described in our copending applications Serial No. 23,655, now Patent No. 3,030,332, and Serial No. 23,656, filed on April 21, 1960, which have been rendered water-soluble by reaction with a suitable base, e.g. ammonium hydroxide or an amine. Thus, the vinyl constituent used for preparing the products of the invention can be described as the water-soluble ammonium or amine salts of a copolymer of (a) an ethylenically unsaturated monomer containing at least one reactive group selected from the class consisting of carboxylic acid and carboxylic anhydride groups and (b) a different ethylenically unsaturated monomer which is free from carboxylic acid and carboxylic anhydride groups, the latter monomer preferably being in excess. To be suitable for use herein, the copolymer should have an acid number of 30 to 150, preferably 60 to 120.

Examples of reactive monomers (a) are acrylic acid; acrylic acid substituted in the alpha carbon by lower alkyl, e.g. methacrylic acid; maleic acid and maleic anhydride.

The other monomeric component (b) is characterized by the group H$_2$C=C< and may be styrene, α-substituted lower alkyl styrenes such as α-methyl styrene, alkyl esters of acrylic and methacrylic acids, especially the lower alkyl esters thereof, e.g. methyl methacrylate, methyl and ethyl acrylate, and mixtures of these materials. The relative amounts of monomers (a) and (b) in the copolymer may be varied but, in any event, the copolymer must comprise a sufficient amount of each monomer to give an acid number within the limits indicated heretofore.

The copolymers used herein may be prepared in the manner described in our copending applications and as indicated above, should be rendered water-soluble by reaction with ammonium hydroxide or an amine. Usually, this reaction is effected at room temperature (e.g. 20–25° C.) although it may be desirable to heat the mixture somewhat to expedite preparation of the solution. The amount of ammonium hydroxide or amine so utilized will vary depending upon other conditions but should be sufficient to give the desired water solubility. This usually means adding sufficient base to give a pH of 6 to 9 or, stated another way, from 5 to 15% base, on the weight of the resin. However, the percentage of base may vary outside these limits depending on the acid number and molecular weight of the base used. Usually the base is added in aqueous solution but if desired, the system may include inert solvents in addition to water, e.g. Cellosolve, ethyl alcohol, butyl alcohol, amyl alcohol or the like.

Typical amines which may be used herein in lieu of, or in addition to, ammonium hydroxide, for preparing the water soluble salt of the vinyl copolymer are: diethylamine, dimethylamine, triethanolamine, ethylenediamine, triethylamine, morpholine, 2-amino-2-methyl-1-propanol and di-isopropylamine. These bases, particularly triethylamine, also appear to have the further function of facilitating cure of the resin at somewhat lower temperatures.

The preparation of various water-soluble salts of vinyl polymers for use according to the present invention is detailed below in the following example wherein parts and percentages are by weight unless stated otherwise and the subject matter of our copending applications mentioned therein is incorporated by reference.

Example 1

A mixture of 400 parts styrene, 360 parts alpha-methyl styrene, 200 parts acrylic acid, 10 parts benzoyl peroxide and 10 parts di-tertiary butyl-peroxide in 750 parts Cellosolve was reacted according to Example I of the above-mentioned copending applications, to give a product comprising 60% non-volatiles in Cellosolve and having an acid number of about 75. The reaction mixture was treated at 20–25° C. with morpholine, using 180 parts of morpholine to 1200 parts of the reaction mixture, until the solids therein were completely dissolved. This solution is directly suitable for use according to the invention.

Other solutions for use herein may be prepared using any of the bases mentioned heretofore with any of the other vinyl copolymers described in the abovementioned copending applications under the conditions outlined above.

Any water-soluble epoxy compound or epoxide may be employed for the purposes of this invention. These compounds are characterized by the presence of one or more epoxy groups having the formula

in the molecule. In general, the epoxide contains two or more epoxy groups per molecule so that it can effectively serve as a cross-linking agent but too many epoxide groups may reduce solubility undesirably. A typically suitable epoxy is butyl di-glycidyl ether (Ciba R D 2) which is appropriately water-soluble and also capable of effective cross-linking.

In lieu of the epoxy compound, or in addition thereto, the products of the invention may include any water-soluble, readily esterifying polyhydroxy compound. This includes such compounds as glycerine, polyethylene glycol 400, polypropylene glycol 425, hexanetriol, hexanediol, ethylene glycol, etc.

The aldehyde curing component, which is added if lower baking temperatures are desired, may be any water-soluble phenol-formaldehyde, urea-formaldehyde or melamine formaldehyde condensate which is compatible with the other components, i.e. will not disrupt the water-soluble system and cause precipitation. These condensates are relatively low molecular weight partial condensates of formaldehyde or paraformaldehyde with phenols including phenol itself, cresol, resorcinol or the like, urea and/or melamine. A typically suitable water-soluble urea-formaldehyde resin is Beckamine 3560 (Reichhold Chemicals) and a useful melamine-formaldehyde resin is Super Beckamine 3560-65 manufactured by Reichhold Chemicals.

A typical example of the preparation of a suitable water-soluble phenol-formaldehyde resin is set forth below:

*Example II*

A mixture of 33 parts phenol, 64 parts formaldehyde (37%) and 1 part NaOH, by weight, was heated to 160° F. in a vessel equipped with a reflux condenser. The mixture was held at this temperature for 1–1½ hours and refluxed for four hours until a slight haze was obtained when a sample of the mixture was diluted 2500% with distilled water. A vacuum was then applied and maintained until 28% of the water was removed. The solution was neutralized with hydrochloric acid.

As noted above, the products of the invention may be prepared by mixing together preferably in aqueous media, the water-soluble vinyl copolymer salt, the water-soluble epoxy and/or polyhydroxy compound, and, if desired, the water-soluble aldehyde condensate heretofore described. Usually mixing is carried out at room temperature (20–25° C.) although some heat (e.g. 50–90° C.) may be applied if desired.

Relative proportions of the several constituents can be varied and depend upon such factors as the acid number of the vinyl copolymers, the number of epoxy or hydroxy groups in the epoxy or polyhydroxy compound, etc. In any event, the vinyl copolymer and epoxy and/or polyhydroxy compound should be used in amounts such that the number of carboxylic acid groups (or anhydride groups) from the copolymer is approximately equivalent to the total number of epoxy or hydroxy groups which are present as a result of the epoxy or polyhydroxy compounds. The aldehyde resin, if used, should be present in an amount approximately equal to the amount of epoxy or polyhydroxy compound, on a weight basis.

The products of the invention are desirably made up as water-solutions containing from 20 to 70% by weight nonvolatiles with viscosities ranging from A to Z-6 (Gardner-Holdt method). These solutions constitute highly desirable coating vehicles. Conventional ingredients for coating compositions, e.g. fillers, pigments, etc. may also be included therein.

The following specific examples, where parts and percentages are by weight, illustrate typical compositions prepared according to the invention:

*Example III*

1200 parts of the aqueous solution of the morpholine salt of the vinyl copolymer prepared in Example I were mixed with 150 parts of butyl diglycidyl ether at room temperature (25° C.). The resulting mix was applied directly to a metal substrate (e.g. tin plate) and cured by baking at about 200° C., for about 10–15 minutes. A highly satisfactory film was obtained on the substrate.

*Example IV*

The process of Example III was repeated except that about 900 parts of polypropylene glycol 425 were also included. The resulting product was applied in the manner of Example III to give a cross-linked film of improved flexibility and comparable chemical resistance.

*Example V*

Example IV was repeated except that 600 parts of the aqueous solution of phenol-aldehyde resin prepared in Example II were included to give a film of essentially equivalent characteristics to that of Example III using a reduced baking temperature of about 150° C.

*Example VI*

Example V was repeated except that an equivalent amount of Beckamine 3560 (water-soluble urea-formaldehyde condensate) was used in lieu of the phenol-aldehyde resin, a highly satisfactory film was obtained on baking.

It will be recognized that various modifications may be made in the invention as illustrated above. Thus, any other water-soluble amine salts of the indicated vinyl copolymers may be used effectively. Similarly other water-soluble epoxy, polyhydroxy and/or aldehyde resins may be used within the limits indicated.

The aqueous solutions of the invention usually require baking at temperatures between 150° and 210° C., preferably 175° to 200° C., for from 10 to 40 minutes to give an effective film, the aldehyde component if present facilitating the cure in the lower temperature ranges as indicated by the foregoing examples. It will be appreciated that these water-soluble systems are particularly attractive for use as coating compositions because of the possibility of obviating the use of organic solvents.

By the term "water-soluble" as used herein, it is intended to mean a system which is completely soluble in water at 20° C. It is possible that one of the components of the system might not be completely water-soluble, but the other resinous materials already in solution also act as a solvent to give the completely water-soluble system.

While preferred embodiments of the invention have been described above, various modifications may be made therein without departing from the scope of the invention as set forth in the claims wherein we claim:

1. A water-soluble composition which is heat-curable to give a water-insoluble coating, said composition consisting essentially of a mixture of (1) a water-soluble salt selected from the group consisting of water-soluble ammonium and amine salts of a vinyl copolymer of (*a*) a member of the group consisting of acrylic acid, alpha-alkyl acrylic acids, maleic acid and maleic anhydride and (*b*) another ethylenically unsaturated monomer selected from the group consisting of styrene, alpha-alkyl styrenes, alkyl esters of acrylic and methacrylic acids and mixtures thereof; and (2) a water-soluble compound selected from the group consisting of water-soluble epoxy compounds and water-soluble polyhydroxy compounds.

2. The composition of claim 1 including a water-soluble condensate of formaldehyde with a member of the group consisting of urea, phenol and melamine.

3. The resinous composition of claim 1 wherein said copolymer has an acid number of 30 to 150.

4. A coating vehicle comprising an aqueous solution of the composition of claim 1.

5. A coating vehicle according to claim 4 including a water-soluble condensate of formaldehyde with a member of the group consisting of urea, phenol and melamine.

6. The resinous composition of claim 1 wherein the relative amounts of said salt and said compound are such that said composition contains approximately the same number of reactive groups from said copolymer as epoxy and hydroxy groups from said compound.

7. A method for preparing the composition of claim 1 which comprises mixing together said constituents.

8. The method of claim 7 wherein said mixing is carried out at a temperature between about 50° C. and about 90° C.

9. The method of claim 8 wherein said mixing is carried out in the presence of water.

10. The method which comprises coating a metal substrate with the composition of claim 1 and then baking said substrate at a temperature between 150° C. and 210° C. for 10 to 40 minutes.

11. The coated metal product obtained by the method of claim 10.

12. The product obtained by baking the composition of claim 1.

13. A water-soluble composition which is heat-curable to give a water-insoluble coating, said composition consisting essentially of a mixture of (1) a water-soluble salt selected from the group consisting of water-soluble ammonium and amine salts of a vinyl copolymer of (a) a member of the group consisting of acrylic acid, alpha-alkyl acrylic acids, maleic acid and maleic anhydride and (b) another ethylenically unsaturated monomer selected from the group consisting of styrene, alpha-alkyl styrenes, alkyl esters of acrylic and methacrylic acids and mixtures thereof; and (2) butyl diglycidyl ether.

References Cited in the file of this patent
UNITED STATES PATENTS

| | | |
|---|---|---|
| 2,787,603 | Sanders | Apr. 2, 1957 |
| 2,906,624 | Daniel | Sept. 29, 1959 |